Figure 1:
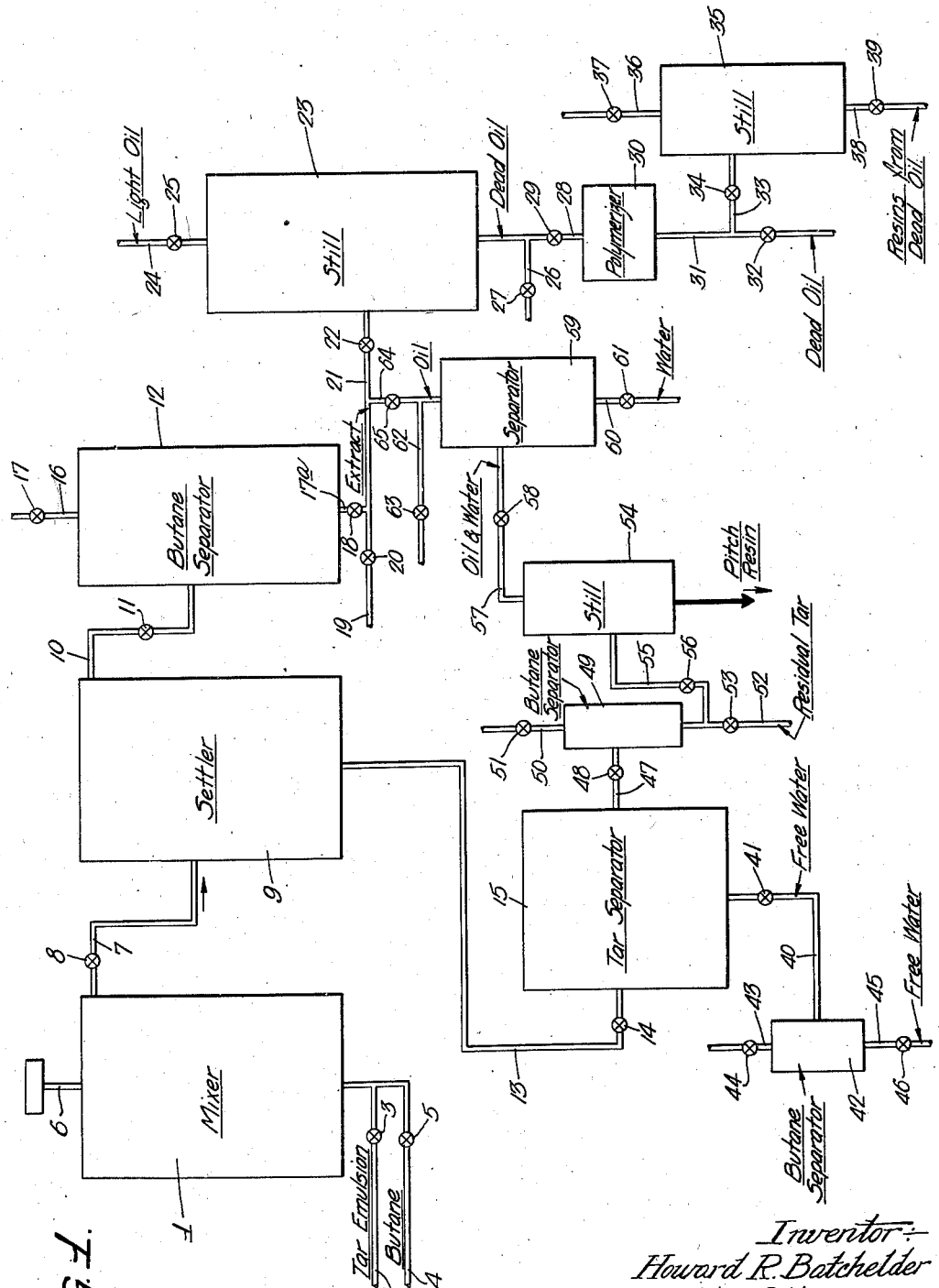

Patented Feb. 22, 1949

2,462,593

UNITED STATES PATENT OFFICE 2,462,593

PITCH RESIN

Howard R. Batchelder, Chicago, Ill., assignor to The United Gas Improvement Company, a corporation of Pennsylvania Application August 17, 1945, Serial No. 611,130

6 Claims. (Cl. 196—152)

1

This application is a continuation-in-part of my copending applications Serial No. 353,034 filed August 17, 1940, which has matured into Patent 2,383,362 granted August 21, 1945, and Serial No. 477,363, filed February 27, 1943, which has matured into Patent 2,383,363 granted August 21, 1945.

The present invention is particularly directed to residual tars and pitch resins obtained by the use of the separation processes of my said copending applications.

In the manufacture of carburetted water gas and oil gas, petroleum oil is pyrolytically decomposed in vapor phase at relatively high temperatures in the presence of steam and/or other diluent gases.

Depending upon the cracking environment and the oil employed the decomposition of the oil may produce varying quantities of products ranging from hydrogen to carbon, including methane, ethane, ethylene, propane, propylene, butane, butylene, butadiene, cyclopentadiene, isoprene, piperylene, benzene, toluene, xylenes, styrene, methyl styrenes, indene, naphthalene, methyl naphthalene, anthracene, and other heavy aromatic hydrocarbons, condensed ring compounds of asphaltic character and other saturated and unsaturated compounds.

The more readily condensible compounds are normally removed from the gas by condensation and/or scrubbing or other means. The extent to which condensation and/or other removal is carried out varies. In some cases substantial quantities of benzene and toluene may remain in the gas. In other cases the removal may include substantially all the $C_4$ hydrocarbons such as butadiene, or may include $C_2$ hydrocarbons such as ethylene.

In the condensation of the hydrocarbons from the gas relatively large volumes of water vapor are also condensed and a part or all of the resultant water forms emulsions with the liquid hydrocarbons. In these tar emulsions the water is in the inner or dispersed phase with liquid hydrocarbon material constituting the outer phase or dispersion medium. The quantity of emulsion and its stability varies with the oil employed and with the oil cracking environment. The quantity of water in the emulsion may vary up to say 90% or higher, and emulsions of great stability may be formed from which little or no water separates by gravity on prolonged standing.

Various theories as to the causes of tar emulsion formation have been advanced. In general, it has been thought that primarily the emulsifying agent is a hydrocarbon substance possibly of asphaltene characteristics which assists the oil components in forming a membrane surrounding the water droplets and preventing their coalescence, that the toughness of the film determines

2 the stability of the emulsion, and that the effect of the membrane is enhanced by the presence of free carbon.

Whatever may be the correctness of the various theories, the tar emulsions are formed and constitute a problem in the processing of tars of the class described, not presented in the processing of certain other tars such as coal gas tars, in which little, if any, trouble from tar emulsions is encountered.

The tar with relatively high water content is generally termed wet tar or tar emulsion. The hydrocarbon content of the wet tar or tar emulsion is termed dry tar and comprises light oil boiling up to about 210° C., dead oil boiling above 210° C., such as from 210° C. to 400° C. and higher for example to 425° C. or 450° C. and above, and residual tar in which pitch resin is concentrated. In general, the volatile portion of the dry tar and especially the higher boiling fractions thereof is predominantly aromatic in character. This is in contrast to the products of relatively lower temperature fractional distillation of petroleum oil in which lubricating oil is a desired product and in which it is desired to preserve as much as possible the paraffinic characteristics of the lubricating oil fraction.

Tar emulsions have little value per se. Even for use as boiler fuel the water content should not be higher than 25%. The dry tar may have great value, particularly if the oil cracking has been carried on so as to produce relatively large quantities of valuable resin-forming hydrocarbons, such as for instance, butadiene, cyclopentadiene, isoprene and piperylene, styrene, methyl styrenes, indene and other unsaturated aromatic hydrocarbons, which may be accompanied by valuable quantities of saturated aromatics such as benzene, toluene, and xylenes.

Various methods of dehydrating wet tar of the class described have been proposed and employed including mechanical methods such as high speed centrifuging of hot tar; boiling to atmosphere to cause sufficient dehydration to produce boiler fuel, and distillation involving evaporation of substantially all the water content to produce dry tar and remove light oil and some dead oil. All such methods are relatively costly and not as effective in recovering valuable hydrocarbon constituents as the method of the present invention.

In the process of my first mentioned copending application, tar emulsions of the character described are broken with separation of water therefrom and with the fractionation of the hydrocarbon component of the emulsion, by mixing said emulsions with liquefied normally gaseous hydrocarbon solvent, such, for example, as hydrocarbons of from 2 to 4 carbon atoms per molecule. Examples of such liquefied normally gaseous hydrocarbon solvents are liquefied ethane, ethylene, propane, propylene, butanes, such as normal butane and isobutane and butylenes such as butene-1, butene-2 and isobutylene, either alone or in admixture with each other.

Of the liquefied normally gaseous hydrocarbon solvents of from 2 to 4 carbon atoms per molecule, aliphatic hydrocarbons containing no greater unsaturation than one double bond per molecule are preferred, especially those of from 3 to 4 carbon atoms per molecule, namely propane, propylene, butanes and butylenes.

Of these latter liquefied normally gaseous hydrocarbons the butanes and mixtures thereof with butylenes have been found especially desirable in that they possess excellent emulsion breaking properties and may be employed under moderate pressure conditions, while the resulting phases may be very readily separated after the demulsification step.

In the process of my second mentioned copending application, tar emulsions of the character described are broken with separation of water therefrom and with the fractionation of the hydrocarbon component of the emulsion, by mixing said emulsions with liquid phase hydrocarbon material of more than four and less than seven carbon atoms per molecule. The very great majority of such hydrocarbons are normally liquid, that is, they are in liquid phase under standard conditions of temperature (60° F.) and absolute pressure (760 mm. Hg). However, such hydrocarbons of five carbon atoms per molecule as neopentane (boiling point approximately 49° F.) are included in the scope of the invention.

Of the hydrocarbon solvents of more than four and less than seven carbon atoms per molecule, it is preferred to employ aliphatic hydrocarbon materials as compared to alicyclic hydrocarbons and benzene.

Saturated hydrocarbons of more than four and less than seven carbon atoms per molecule are more preferred than unsaturated hydrocarbons of the same number of carbon atoms per molecule.

Unsaturated hydrocarbons of more than four and less than seven carbon atoms per molecule having 1 double bond are more preferred than unsaturated hydrocarbons having more unsaturation than 1 double bond.

Normal hydrocarbons of more than four and less than seven carbon atoms per molecule are more preferred than branched chain hydrocarbons of the same number of carbon atoms per molecule and the same degree of saturation or unsaturation.

Hydrocarbons of 5 carbon atoms are more preferred than hydrocarbons of 6 carbon atoms of the same type.

In accordance with the foregoing, of the hydrocarbons of more than four and less than seven carbon atoms per molecule, a solvent preponderantly comprised of material selected from the group of aliphatic hydrocarbons consisting of the pentanes, the amylenes, and the hexanes is particularly preferred.

Of these, the pentanes and the amylenes are still more particularly preferred. Furthermore, among the group consisting of pentanes and amylenes, the pentanes, namely, normal pentane, isopentane and neopentane are preferred, with normal pentane the most preferred.

The employment of hydrocarbon solvents containing more than 6 carbon atoms per molecule are not recommended in that among other things, separation by settling of the various phases formed becomes increasingly difficult as the molecular weight of the solvent is increased, so that with solvents containing more than 6 carbon atoms, the extracts obtained are greatly contaminated with pitch, the pitch is likewise contaminated with extract, and separation is poor.

When the higher boiling of the hydrocarbon solvents containing 5 or 6 carbon atoms per molecule are employed, higher temperatures are advisable to enhance water separation, but with an increase in temperature there usually is a decrease in viscosity of the residual tar and a decrease in the difference in specific gravity of the layers which makes phase separation more difficult.

Of the hydrocarbon solvents of 5 or 6 carbon atoms per molecule, the pentanes are particularly advantageous for use hereunder, in that they possess excellent emulsion breaking properties, and in that the resultant phases may be readily separated after the de-emulsification step.

It is to be understood of course that the hydrocarbon solvents set forth above may be used in a substantially pure form or technical grades of the selected hydrocarbons may be employed, that is, the solvent may contain, in addition to a selected hydrocarbon, other hydrocarbons of similar nature, for example a liquid phase mixture comprised preponderantly of butane, but containing butylenes, such as butene-1, butene-2 and/or isobutylene, with smaller proportions of propane and propylene and/or pentane and amylene, and possibly impurities, particularly in small amounts is an excellent solvent for use in my invention. Another example of the use of a technical grade of solvent is the employment of a liquid phase mixture comprised preponderantly of pentane but containing amylenes, butanes, and butylenes and/or hexanes, and possibly impurities, particularly in small amounts. A mixture of pentane with $C_4$ hydrocarbons is preferred to a mixture of pentane with $C_6$ hydrocarbons from the standpoint of recovering extracts with low pitch contamination and recovering pitches containing relatively little dead oil.

The hydrocarbon solvents employed in my first mentioned copending application may be employed in any desired mixture with those employed in my second copending application. For example, a liquid phase mixture containing approximately equal parts of butane and pentane is an excellent solvent for use hereunder as are also liquid phase mixtures such as mixtures of propane and pentane, butylene and pentane, butane and amylene, and others.

For convenience, the invention will be described in further detail in connection with the employment of liquefied butane as the solvent.

The proportion of liquefied butane or other solvent to dry tar required for a given degree of separation of tar emulsion into water, oil and residual tar may vary with a number of factors including the chemical characteristics of the tar, the degree of mixing of liquefied butane with the emulsion, the temperature and pressure at which the extraction is carried out, and the time of extraction. The desired degree of separation may vary also depending upon factors including facility of handling the residual tar precipitated by the extraction.

The chemical characteristics of the tar treated may vary depending upon the petroleum oil pyrolyzed, upon environmental factors of pyrolysis including temperature, time of contact, and the presence or absence of catalysts, and upon condensation factors such, for instance, as the extent to which condensation of materials from the gas is effected, and the degree of fractional condensation employed.

The invention may be readily practiced by batch or continuous operation.

Figure 2:
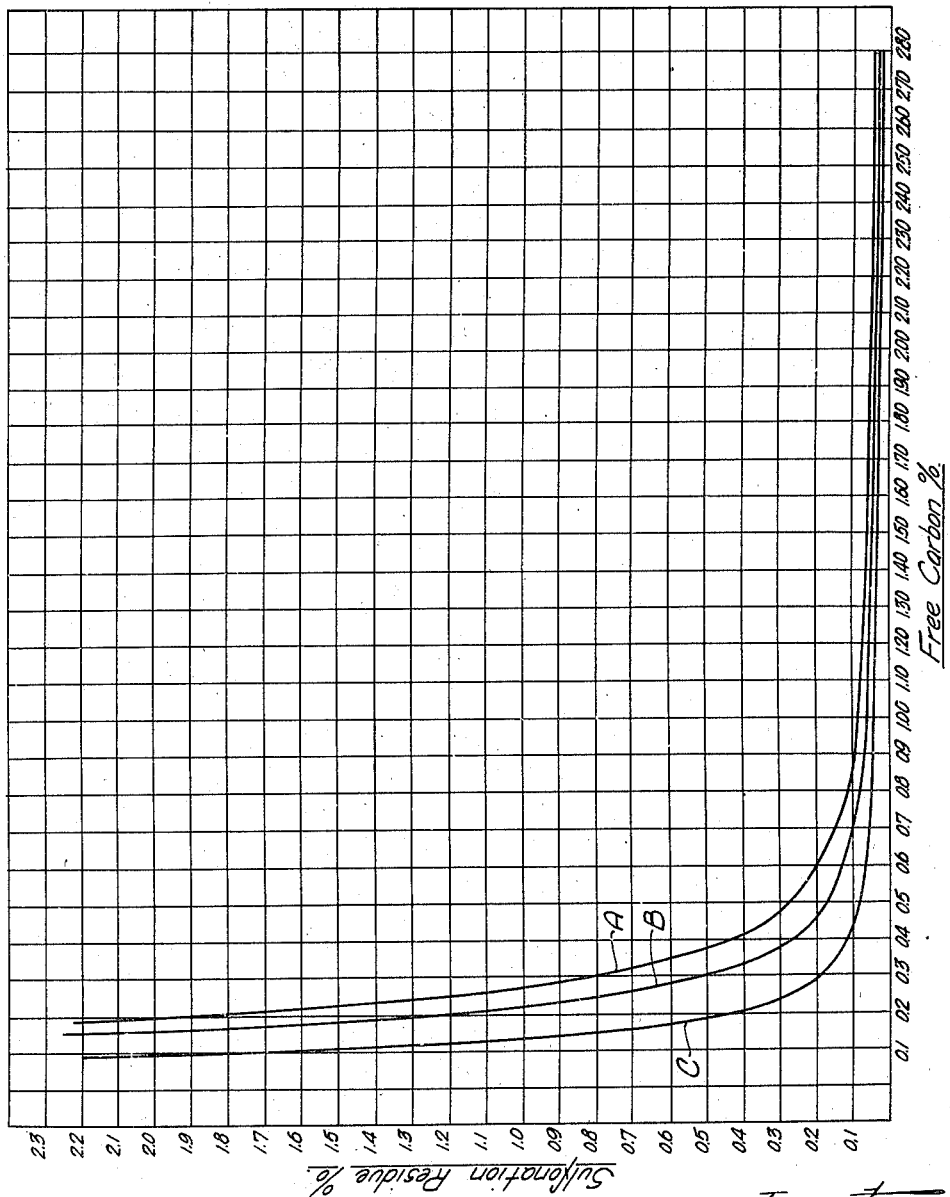

Further features of the invention reside in the steps, combinations and sequences of steps, and in the construction, arrangement of and combination of parts, all of which together with other features will become more apparent to persons skilled in the art upon becoming familiar herewith and upon reference to the drawings in which:

Fig. 1 shows somewhat diagrammatically apparatus, chosen for illustration, in which the methods of tar emulsion separation of my above mentioned copending application may be performed, and Fig. 2 shows relationships of sulfonation residue and free carbon defining preferred conditions of uniformity and homogeneity of petroleum oil cracking for the production of tar emulsions, which are preferred sources of the pitch of the present invention.

Referring to Fig. 1, mixer 1 is shown provided with tar emulsion supply means such as connection 2, provided with valve 3, and butane supply means 4, provided with valve 5. The mixer is preferably provided with means for securing intimate mixing of the emulsion and liquefied butane such, for example, as is provided by a propeller mixer, the shaft of which is indicated at 6.

In the mixer at least a portion and preferably the bulk of the emulsion is broken by solution in butane of hydrocarbons comprised in the outer phase of the emulsion. After the expiration of the desired time of mixing which may be termed the time of extraction, the materials may be drawn off through connection 7, provided with valve 8, to the settler 9.

In the settler the mixture is permitted to settle and separate by gravity. Hydrocarbons dissolved in butane are drawn off through connection 10 provided with valve 11 to the butane separator 12.

The degree of separation in the settler may vary depending upon factors including the time of settling. Preferably, the separation is conducted so that the bulk of the dissolved hydrocarbons or extract and the bulk of the solvent may be drawn off without substantial inclusion of undissolved or precipitated material.

From the lower portion of the settler 9, undissolved or precipitated components of the emulsion comprising free water and residual tar may be drawn off through connection 13 provided with valve 14, and passed to separator 15. The free water and residual tar passed to separator 15 may be accompanied by a portion of the hydrocarbons dissolved in butane, and the residual tar may include residual emulsion.

Returning to butane separator 12, separator 12 may conveniently comprise a butane still provided with suitable heating means (not shown), and adapted to distill butane from the solution of hydrocarbons in butane. The separator may be provided with suitable packing, if desired, and butane may be refluxed to any desired degree.

The separated butane may be withdrawn overhead through connection 16, provided with valve 17, and after condensation may be recycled to mixer 1, if desired.

It is to be understood, that the butane so withdrawn may be treated, as by distillation or otherwise, for the removal of any material mixed therewith, which may have been derived from the tar, and which it is not desired to recycle.

The separated extract may be withdrawn from the lower portion of the separator 12 by way of connection 17a, provided with valve 18, and may be passed to storage or other disposal by way of connection 19, provided with valve 20 or may be passed by way of connection 21, provided with valve 22, to the still 23. Still 23 may be provided with any suitable heating means (not shown).

In still 23 the extract may be fractionally distilled in any desired degree, for instance, a separation may be effected between light oil boiling below about 210° C. and dead oil boiling above about 210° C., for example, between about 210° C. and 400° C. and higher such as 425° C. or 450° C. and above. The light oil is removed overhead by way of connection 24, provided with valve 25, to storage, further fractionation, or other disposal.

If desired, after the removal of the light oil overhead, the relatively lower boiling portion of the dead oil boiling, for example, between about 210° C. and 310 to 315° C. and containing, for example, from 10% to 50% of heat polymerizable unsaturated aromatic hydrocarbon material may be taken off overhead, leaving as bottoms a relatively heavy dead oil material boiling above 310° to 315° C., for example, between 310° C. and 400° C., 425° C. or 450° C. and above, and containing a very high content of heat polymerizable unsaturated aromatic hydrocarbon material, such for example as from 50 to 60% to 70 or 80% and above.

In still 23, heat polymerizable aromatic resin-forming hydrocarbons boiling above 210° C., for example, within the above mentioned ranges and present in the extract may, if desired, be polymerized at least in part. These heat polymerizable resin-forming hydrocarbons are polymerized by heat in the usual tar emulsion distillation methods with the resulting polymers becoming a part of the residual tar or pitch and being lost therein. This is particularly true of the relatively higher boiling heat polymerizable unsaturated aromatic hydrocarbons such as those boiling between 310° C. or 315° C. and 400° C., 425° C. or 450° C. In the separation of the tar emulsion by solvent extraction as described herein, these heat polymerizable resin-forming aromatic hydrocarbons boiling above 210° C. are separated in large part in the extract, from which they may be readily recovered in monomeric form or in the form of heat polymer, or since they are also polymerizable with the aid of resin-producing catalysts, in the form of catalytic polymer. Reference is made to copending application Serial No. 370,608, filed December 18, 1940, by Edwin L. Hall and Howard R. Batchelder, which has matured into Patent 2,387,259 granted October 23, 1945, and to copending application Serial No. 386,232 filed April 1, 1941, by Waldo C. Ault, which has matured into Patent 2,387,237 granted October 23, 1945, From the lower portion of still 23 the dead oil which, if desired, may contain considerable quantities of polymerized resin formers as above described, may be withdrawn by way of connection 26, provided with valve 27, to storage or other disposal or may be passed by way of connection 28, provided with valve 29, to polymerizer 30.

Polymerizer 30 may be provided with any suitable heating means and in it the polymerization of the resin formers may be completed or continued to the desired degree with or without the aid of catalysts.

From the polymerizer, the dead oil with the polymerized resin formers may be withdrawn by way of connection 31, provided with valve 32, to storage or other disposal, or may be passed by way of connection 33, provided with valve 34, to still 35. Still 35 may be provided with any suitable heating means (not shown) and may be operated at any desired pressure.

In still 35 the resins may be separated from the dead oil, the dead oil being taken off overhead by way of connection 36, provided with valve 37, to storage, further fractionation or other disposal. The resins may be withdrawn from the lower portion of the still 35 by way of connection 38, provided with valve 39, to storage, further treatment or other disposal.

The light oil boiling up to about 210° C., recovered herein, may contain greatly increased quantities of heat polymerizable aromatic unsaturated hydrocarbons boiling in the range between the boiling point of indene (182° C.) and 210° C., as compared with the quantities in light oil produced by conventional methods of tar distillation. In ordinary tar distillation methods, these compounds are largely polymerized by heat during the distillation, the polymers forming part of the residual tar from which they can be separated only with great difficulty, if at all. These resin formers or their polymers however may be readily separated from the light oil obtained from the extract with a large increase in the yield of such compounds.

Returning to separator 15. In separator 15 residual tar, which may include residual emulsion and will normally be accompanied by butane, may be conveniently separated from the free water released from the emulsion by the foregoing extraction by gravity settling under normal or elevated pressure. Pressures up to 100 lbs. per sq. in. gauge have been found convenient. On the other hand, pressure may be reduced, if desired, prior to settling. It is preferred however to avoid sudden reductions of pressure, which may cause a persistent dispersion of tar particles in the water, making complete separation of tar from water more difficult.

In the apparatus, chosen for illustration, the settling may be conducted under pressure, the free water being drawn off from one portion of the separator as by way of connection 40, provided with expansion valve 41, and passed to separator 42. Butane absorbed in the water and released by reduction in pressure may be flashed off and withdrawn by way of connection 43, provided with valve 44. Free water may be drawn off by way of connection 45, provided with valve 46, to waste or other disposal.

The residual tar which may include residual emulsion and which may be accompanied by a portion of the hydrocarbons dissolved in butane, may be withdrawn from separator 15 as by way of connection 47, provided with expansion valve 48, to separator 49. The reduction in pressure flashes off butane from the material entering separator 49, the butane being withdrawn by way of connection 50, provided with valve 51.

It will be understood that any low boiling material derived from the tar which separates with the butane, may be removed therefrom by distillation or otherwise, should it not be desired to recycle such material.

The residual tar which may include residual emulsion and hydrocarbons separated from solution in butane, may be withdrawn through connection 52, provided with valve 53 to storage or other disposal or may be passed, if desired, to still 54 by way of connection 55, provided with valve 56.

In still 54 the residual emulsion may be broken, residual water and oil may be separated by distillation from the pitch resin of the residual tar, and removed overhead by way of connection 57, provided with valve 58, to separator 59. The pitch resin may be removed from the lower portion of the still by any convenient means (not shown). If distillation of a considerably destructive character is employed the pitch resin bottoms may be coked to a pitch coke, which may be removed from the base of the still by any convenient means (not shown).

In separator 59 oil and water may be separated by gravity, the water withdrawn by way of connection 60, provided with valve 61 and the oil by way of connection 62, provided with valve 63, leading to storage or other disposal. If desired, the oil may be passed by way of connection 64, provided with valve 65, to still 23 together with the extract from separator 12.

The proportion of the emulsion broken and the proportion of oil separated from the pitch resin will depend, other conditions being equal, upon the ratio of the quantity of hydrocarbon solvent employed to the quantity of dry tar. In order to facilitate the handling of the residual tar through the apparatus prior to distillation, it may be preferred to leave in the precipitated material sufficient oil to render the residual tar fluid.

Other conditions being equal, including the hydrocarbon solvent-dry tar ratio, with increasing operating temperatures and pressures, the yields of extract tend to increase, and the yields of residual tar to decrease.

Compromise may be readily effected between the relative advantages of low hydrocarbon solvent-tar ratios and low pressure and temperature extraction conditions in effecting the desired degree of extraction.

When employing as the solvent paraffinic and/or olefine material of from 3 to 4 carbon atoms per molecule, such for example as a liquefied normally gaseous hydrocarbon solvent comprised preponderantly of liquefied propane and/or liquefied butane, temperatures of the order of about 50 to 90° F. have been found convenient as they are accompanied by relatively moderate pressures, such as pressures of the order of from 90 to 165 pounds per square inch in the case of propane, and less in the case of butane, and require relatively moderate solvent-dry tar ratios in the cases of many tar emulsions tested.

When a hydrocarbon solvent of from 5 to 6 carbon atoms per molecule such, for example, as pentane is employed as the solvent, temperatures in the range of about 70° F. to 200° F. are convenient, as they are accompanied by relatively moderate pressures, for example, in the case of pentane from about 0 to 150 pounds per square inch gauge, and normally require relatively moderate solvent-dry tar ratios.

The temperatures given above are illustrative and higher or lower temperatures than those given are in no way precluded hereunder.

Very low temperatures have the disadvantage of increasing the viscosity of the residual tar, while very high temperatures have the disadvantage of accompanying high pressures and less efficient phase separation.

It may be advantageous, in some circumstances, to operate in the neighborhood of the critical temperature of the hydrocarbon solvent. This may have the disadvantage of accompanying high pressure, but may have advantages in increased efficiency of extraction.

As previously stated, other conditions being equal, the required hydrocarbon solvent-dry tar ratio for a given degree of extraction varies with the chemical character of the dry tar. Apparently the ratio required varies directly with the average molecular weight of the dry tar, although this may not be true in every case.

Ratios of hydrocarbon solvent of the character described such, for example, as propane, butane, and/or pentane or liquid hydrocarbon mixtures containing them to dry tar of from approximately 0.7 and lower to approximately 3 and higher, by weight, may be employed successfully in the treatment of tars of widely varying characteristics, with ratios from 0.9 to 2.2 or from 1.0 to 1.5 by weight, usually more particularly preferred. The specific ratios above are given for illustration and it is not intended to preclude the employment of lower or higher ratios.

The following examples are given to further illustrate my invention.

Example 1

A stable tar emulsion of the class described resulting from the pyrolysis of a naphthenic crude petroleum oil in the presence of approximately one pound of steam per pound of oil in an oil-gas set having an average set temperature of approximately 1490° F., the emulsion having been formed on condensation of the products of pyrolysis to 90° F., was intimately mixed with liquefied propane over 95% pure in proportion of approximately 1.45 parts propane to 1 part of emulsion by weight. The emulsion contained approximately 45% water and approximately 55% dry tar by weight.

The propane and emulsion were mixed for approximately 15 minutes by means of a two-stage turbo mixer at an operating pressure of approximately 100 pounds gauge and a temperature of about 70° F. and the bulk of the emulsion broken. The material was allowed to settle by gravity for approximately 15 minutes and the dissolved hydrocarbons together with solvent drawn off from the water and residual tar. The solvent was flashed off from the separated solution and the extract fractionally distilled to separate light oil and dead oil. Residual solvent was also flashed off from the residual tar and water and the residual tar and water separated by gravity settling. The residual or extracted tar was distilled to pitch resin and residual water separated from the oil distillate by gravity settling. The oil distillate from the residual tar was fractionally distilled to separate dead oil and light oil.

The following were the approximate inputs and yields in pounds per pound of dry tar charged.

```
                                    lbs./lb. of dry tar
Input:
    Emulsion _____ 1.85
    Propane _____ 2.68
Recovery: Extract—
    Light oil _____ 0.437
    Dead oil _____ 0.383
                                             ─────
        Total _____ 0.820
Extracted tar:
    Light oil _____ 0.011
    Dead oil _____ 0.003
    Pitch resin _____ 0.166
    Water _____ 0.142
                                             ─────
        Total _____ 0.322
    Water decanted _____ 0.708
```

Percentage of total water in emulsion separated by extraction—83%

In the heating of the dead oil 0.198 lb. of heat resins per pound of dry tar were produced through polymerization of aromatic heat polymerizable resin formers contained in the dead oil.

Example 2

The same emulsion was treated under the same conditions as in Example 1 except that the proportion of propane to emulsion was approximately 0.72 part propane to 1 part emulsion.

The input and yields in lbs. per lb. of dry tar were as follows:

```
                                    lbs./lb. of dry tar
Input:
    Emulsion _____ 1.85
    Propane _____ 1.33
Recovery: Extract—
    Light oil _____ 0.412
    Dead oil _____ 0.370
                                             ─────
        Total _____ 0.782
Extracted tar:
    Light oil _____ 0.037
    Dead oil _____ 0.012
    Pitch resin _____ 0.167
    Water _____ 0.381
                                             ─────
        Total _____ 0.597
    Water decanted _____ 0.469
```

Percentage of total water in emulsion separated by extraction—55.2%

In the heating of the dead oil 0.177 lb. of resins per lb. of dry tar were produced through polymerization of aromatic heat polymerizable resin-formers contained in the dead oil.

Example 3

100 pounds of a tar emulsion obtained in the vapor phase pyrolysis of a highly naphthenic crude petroleum oil, said emulsion containing approximately 70 pounds of dry tar and approximately 30 pounds of emulsified water, together with 132.6 pounds of butane in liquid phase were charged to the mixing chamber and agitated for 45 minutes at approximately 70° F. After settling for approximately 20 minutes, 9.8 pounds of separated water were drawn off. Following this, 165 pounds of extract were removed containing 124 pounds of butane. Approximately 46 pounds of hydrocarbon material was dissolved from the original emulsion, leaving approximately 29 pounds of undissolved hydrocarbon material together with approximately 20 pounds of water.

On distillation of the undissolved hydrocarbon material and water, after flashing off its small content of butane, approximately 2.8 pounds of additional oil was recovered overhead leaving a bottoms of approximately 20 pounds of pitch resin.

The extract and solvent were distilled, and after taking off the solvent, approximately 13 pounds of light oil boiling below 210° C. were taken off overhead leaving approximately 28 pounds of dead oil material boiling between 210° C. and approximately 450° C. and containing some heat polymerized resin produced during the distillation and also containing a considerable proportion of unpolymerized heat polymerizable hydrocarbon material. After heat polymerization of the separated dead oil at 200° C. for four hours approximately 12 pounds of heat polymerized resin of 100° C. softening point by the A. S. T. M. ball and ring method were recovered, together with approximately 16 pounds of a high boiling aromatic oil containing catalytically polymerizable unsaturated hydrocarbon material but substantially free from heat polymerizable unsaturated hydrocarbon material.

The heat polymer of 100° C. A. S. T. M. ball and ring softening point is considered to contain approximately 20% of high boiling oil, so that the actual heat polymer produced from the extracted material boiling over 210° C. was of the order of 9 pounds.

The unsaturated hydrocarbon material from which this heat polymer was produced is so readily polymerizable by heat that in the usual processes for breaking tar emulsions, it is largely polymerized during distillation and becomes a part of the residual tar or pitch. It will be seen that in the operation of the above example the avoidance of polymerization prior to the separation of the dead oil boiling above 210° C. from the pitch resin prevented an amount of heat polymer from becoming a portion of the pitch resin which was equivalent to more than ⅓ of the pitch resin actually recovered.

*Example 4*

116.1 pounds of a tar emulsion obtained in the vapor phase pyrolysis of a naphthenic crude petroleum oil in the presence of approximately 1 pound of steam per pound of oil pyrolyzed, said pyrolysis taking place in a cyclic oil gas-making operation, and said quantity of emulsion containing 100 pounds of dry tar and 16.1 pounds of emulsified water, was mixed with 148.8 pounds of liquefied butane and agitated with a two-stage "Turbo Mixer" for twenty minutes, and then allowed to settle for twenty minutes, with the formation of a separated water layer amounting to 1.9 pounds.

The solvent-extract layer produced amounted to 212.9 pounds of which 133.9 pounds was solvent.

After removal of the solvent by distillation, 21.5 pounds of light oil were taken off overhead leaving 57.5 pounds of dead oil boiling above 210° C. and containing sufficient heat polymerizable unsaturated aromatic hydrocarbons to produce on polymerization at 200° C. for four hours 30.7 pounds of heat resin having an A. S. T. M. ball and ring softening point of 100° C.

The extracted tar layer amounted to 36.1 pounds and after flashing off its small solvent content was distilled with the separation overhead of 14.6 pounds of water, 1.4 pounds of light oil, and 0.6 pound of dead oil, leaving 19.4 pounds of pitch resin.

In similar operations upon the same emulsion, distillation of the extract after removal of the solvent yielded approximately 35.6 pounds per 100 pounds of dry tar of relatively light dead oil material boiling between 210° C. and 310–315° C. and approximately 20.5 pounds per 100 pounds of dry tar of relatively heavy dead oil material boiling between 310° to 315° C. and say 450° C.

The relatively light dead oil material contained sufficient heat polymerizable unsaturated aromatic hydrocarbon material to produce on polymerization at 200° C. for four hours approximately 12.3 pounds of heat polymer of 100° C. A. S. T. M. ball and ring softening point.

The relatively heavy dead oil material contained sufficient heat polymerizable unsaturated aromatic hydrocarbon material to produce upon polymerization at 200° C. for four hours approximately 15.9 pounds of heat polymer having an A. S. T. M. ball and ring softening point of 100° C.

*Example 5*

10.4 pounds of a petroleum tar emulsion obtained in the vapor phase pyrolysis of a naphthenic crude petroleum oil in the presence of approximately one pound of steam per pound of oil pyrolyzed and in a cyclically operated gas-making operation, said emulsion containing 6.6 pounds of dry tar and 3.8 pounds of emulsified water is also charged to a mixing chamber together with 6.6 pounds of pentane, heated to 115° F. and agitated for 45 minutes. After settling for approximately 20 minutes, 2.3 pounds of separated water were drawn off. Following this, 11.2 pounds of extract was drawn off which contained substantially all of the solvent employed, that is, approximately 4.5 pounds of hydrocarbon material was dissolved from the emulsion leaving approximately 2.1 pounds of undissolved hydrocarbon material together with the remaining water. On distillation of this undissolved hydrocarbon material after flashing off its small content of solvent and after distilling off its water content, an additional yield of approximately 0.6 pound of oils was recovered overhead, leaving a bottoms of approximately 1.5 pounds of pitch resin.

Readily heat polymerizable unsaturated aromatic resin-forming material boiling between 210° C. and 450° C. was present in the extract to the extent of 16.2% of the original dry tar.

The time of extraction may vary, it being understood that times of extraction sufficiently long to arrive at or near equilibrium require a lower hydrocarbon solvent ratio for a given extraction than shorter times of extraction. The required time of extraction, depends, other conditions being equal upon the efficiency of mixing the emulsion with the hydrocarbon solvent.

Employing an efficient stirring device such as a "Turbo Mixer," I have found times of extraction of the order of 10 to 20 minutes and more such as 40 to 45 minutes convenient.

Factors such as the particular character of the extracted and residual materials, pressure and temperature of operation, time of extraction and proportionate quantity of solvent employed may vary depending upon the particular solvent used.

It may be advantageous under certain conditions to collect and treat separately the tars from different stages of fractional condensation of the gas. Such tars have different chemical characteristics and the character of the extract necessarily varies between such operations. The quantity of benzol originally present in the tar, for example, may modify the extraction and a relatively high percentage of such benzol may cause the substantial solution of materials not dissolved to such an extent, if appreciably, in the presence of relatively small benzol concentrations.

Resins produced from the readily heat polymerizable unsaturated aromatic material boiling above approximately 210° C. present in the extract derived from the relatively heavier condensate fractions tend to be lighter in color than those derived from the relatively lighter condensate fractions, when the same solvent is added for the extraction.

High benzol concentrations may be present because of cracking the petroleum oil in the presence of additional benzol as described and claimed by Newcomb K. Chaney in U. S. Patent Number 2,226,531, or benzol may be added to the emulsion together with aliphatic hydrocarbon solvent of from 2 to 6 carbon atoms per molecule if desired.

The residual tars produced in the employment of my invention differ materially from residual tars produced as a result of fractionating tar emulsions by distillation, because of the absence, in the residual tars produced hereunder, of large proportions of heat polymers which are produced in distilling tar emulsions.

The pitch resins produced by distilling the residual tars separated from tar emulsions by solvent extraction hereunder also differ materially from the pitches produced from residual tars separated from tar emulsions by fractional distillation, because large quantities of heat polymerizable unsaturated aromatic hydrocarbons boiling between 210° C. and 450° C. which are present in polymeric form in the pitch containing residual tar produced by the distillation of the tar emulsion are in the present process recovered in a liquid phase, separate from the undissolved residual tar containing the pitch.

Pitch resins separated by the processes of my two first mentioned copending applications from tar emulsions obtained in the vapor phase pyrolysis of petroleum oils which contain less than 7% and preferably less than 4% of Conradson carbon and which are classifiable in classes 5 to 7 by the petroleum oil classification method of Bureau of Mines Report of Investigations 3279 and cuts of such oils are particularly desirable, especially in the case of petroleum oil classifiable in class 7 by said Bureau of Mines method and cuts thereof.

Especially valuable are pitch resins separated by the processes of my said two first mentioned copending applications from tar emulsions obtained in the vapor phase pyrolysis of such petroleum oils or cuts thereof by the process of copending application Serial No. 372,074, filed December 28, 1940, by Newcomb K. Chaney and Edwin L. Hall, which has matured into Patent No. 2,383,772, granted August 28, 1945.

That application and the patent which has matured from it gives the following detailed description of the oil classification.

In the classification of a crude oil in accordance with the Bureau of Mines method disclosed in Bureau of Mines Report of Investigations R. I. 3279, previously referred to, a given petroleum oil is subjected to fractional distillation and two cuts are collected, the first having a boiling range between 250° and 275° C. at atmospheric pressure, and the second having a boiling range between 275° and 300° C. at 40 mm. absolute pressure.

For convenience of identification, the lower boiling fraction is referred to as key fraction 1 and the higher boiling fraction is referred to as key fraction 2.

From the A. P. I. gravities of these key fractions, the classification of the original oil is made as follows:

If the A. P. I. gravity of key fraction 1 is 33 or below 33, the fraction is classified as naphthenic; if it is between 33 and 40 the fraction is classified as intermediate; and if it is 40 or above 40 the fraction is classified as paraffinic.

If the A. P. I. gravity of key fraction 2 is 20 or below 20, the fraction is classified as naphthenic; if it is between 20 and 30 the fraction is classified as intermediate; and if it is 30 or above 30 the fraction is classified as paraffinic.

As a result of the foregoing classifications of the key fractions, the original oil is given one of seven classifications as follows.

If both key fractions are paraffinic, the original oil falls in class 1. If key fraction 1 is paraffinic and key fraction 2 is intermediate, the original oil falls in class 2.

If key fraction 1 is intermediate and key fraction 2 is paraffinic the original oil falls in class 3.

If both key fractions are intermediate, the original oil falls in class 4.

If key fraction 1 is intermediate and key fraction 2 is naphthenic the original oil falls in class 5.

If key fraction 1 is naphthenic and key fraction 2 is intermediate the original oil falls in class 6.

If both key fractions are naphthenic, the original oil falls in class 7.

In the process of said last mentioned copending application, a naphthenic petroleum oil containing less than 7% and preferably less than 4% of Conradson carbon and which is classifiable in said Bureau of Mines classes 5 to 7 and particularly in class 7 or a cut of such a petroleum oil is pyrolyzed in vapor phase under conditions of "uniform" and "homogeneous" cracking and with an intensity of cracking such that the cu. ft. of "residual oil gas" produced per gallon of oil pyrolyzed falls between 40 and 65 cu. ft. and preferably between 45 and 60 cu. ft. per gallon of oil pyrolyzed, taken as if measured at a pressure of 760 mm. of mercury and at a temperature of 60° F.

A cyclic operation is preferred in which, during a heating period of the cycle, heat is stored in refractory heat storage material arranged in a gas making path, by the passage therethrough of hot blast gases produced by the combustion of solid, liquid or gaseous fuel, and during an oil pyrolyzing period in the cycle, the selected petroleum oil is pyrolyzed in said path by said stored heat. However, a continuous operation such as tube cracking may be employed if desired.

"Residual oil gas" is defined as the uncondensed final gas remaining after the removal of substantially all water vapor, or after correction for the presence of water vapor; and after the removal of all hydrogen sulfide, or after the correction for the presence of hydrogen sulfide (unless the oil is low in sulfur content, in which the hydrogen sulfide is negligible for the calculation of residual oil gas); and after the removal of substantially all hydrocarbons having more than three carbon atoms or after correction for the presence of hydrocarbons having more than three carbon atoms; and after correction for the presence of gas not derived from the oil cracked, such as air, combustion gases from fuel used for heating the cracking apparatus and after correction for any water gas which may be present.

Other conditions being the same, increase in either (1) temperature, or (2) effective time of contact, or both, increases the volume of "residual oil gas" per gallon of oil, and vice versa.

Various procedures for the control of temperature in cyclic gas making sets are well understood by the skilled gas-maker. These include (1) adjustment of the length of the air blast; (2) adjustment of the rate of fuel consumption during the air blast; (3) adjustment of the length of air blast with respect to the gas-making run or runs; (4) adjustment of the length of the purge or purges; (5) adjustment of the volume of steam or other gas used for purging; (6) adjustment of the length of the cycle; (7) the use of a reverse run or runs and the adjustment of their length; (8) the use of a reverse purge or purges; (9) the use of auxiliary heating means; (10) adjustment of the point of entry of the secondary air and any tertiary air during the air blast, etc.

Time of contact may be controlled by control of various factors one of which is of course the dimensions including cross-sectional area, free space and length of the gas-making path of the gas set. In a given set the length of the gas-making path is more or less fixed and the same applies to the diameters of the various parts thereof. With a given oil and steam rate the time of contact may be increased and decreased with increase and decrease respectively of the free space through which the vapors flow by adjusting the quantity and arrangement of heat storage checkerbrick employed.

Time of contact may also be adjusted by adjusting the oil rate or the steam rate, or both, as will be obvious since the larger the combined volume of the gas passing through the set the shorter the time of contact and vice versa.

The rate at which oil is vaporized in the set, the rate at which the oil is cracked, and the degree to which the oil is cracked are also important factors as is the points or point of oil admission and the points or point of steam admission.

Thus it will be seen that although any exact mathematical determination of time of contact would be extremely involved, the control of the above factors affords the skilled gas-maker a fairly flexible control of time of contact.

"Conradson carbon" is defined as the Conradson carbon determined under the procedure of the Conradson carbon test of A. S. T. M. designation D—189—36.

"Homogeneous" cracking is defined to embrace conditions, such, for example, as concentration of oil vapors, space velocity, turbulence, surface-volume relationships of the interior of the cracking vessel or vessels and character of heated surfaces which are such that in any given plane normal to the flow of materials, the materials throughout the plane have previously had substantially the same opportunity to be heated and to undergo the alternate decompositions and synthesis which comprise cracking and which progress toward products of greater thermal stability under the environment obtaining.

In addition to relative "homogeneity" of cracking which as defined would permit wide changing in conditions during a cycle of a cyclic gas-making operation, it is preferred that cracking conditions be what is termed "relatively uniform" during the cycle.

In a cyclic operation in which oil cracking chambers are heated during a heating period and in which the stored heat is utilized during the cracking period, the quantity of oil gas produced (and the yields of the desired products) per gallon of oil during any individual oil-cracking run will vary somewhat as the temperature of the cracking chambers decreases during said run. The degree of variation will depend among other factors upon the length of the oil-cracking run, the oil and steam input rates, the presence or absence of supplementary heating during the run, the quantity of heat stored during the heating period and the character of the heat storage material.

Very large swings in oil gas production during a cycle are not preferred as any swing in oil gas production during the cycle necessitates the departure from the optimum conditions within the range of the swing and makes the cracking less uniform under the cycle.

Other conditions being fixed, variation of any one of the following factors in the direction cited is considered to tend toward less homogeneity in the cracking operation: (1) decreased surface/volume ratio of the cracking vessels upon the vaporized zone; (2) reduced atomization of the oil; (3) increased impingement of oil or highly heated surfaces prior to vaporization; (4) increased concentration of the oil vapors; (5) decreased turbulence and (6) increased space velocity except as effecting turbulence.

In cyclic operation, other conditions being equal, swings in oil gas production during the cycle may be reduced by reducing temperature swings during the cycle, which is favored by the use of a relatively short cycle and/or by the employment of highly conductive heat storage material.

A convenient measure of the homogeneity and uniformity of the cracking operation is the relation between the sulfonation residue and the free carbon in the condensate from the gas.

Sulfonation residue is a measure of the normally non-gaseous paraffines and naphthenes surviving the cracking operation and hence high sulfonation residue is an indication of light cracking. Free carbon is, on the other hand, an end product in the pyrolysis of hydrocarbons, and hence, highly free carbon indicates severe cracking.

High sulfonation residue together with high free carbon indicates that both light and severe cracking have taken place during the cycle, and hence is an indication of great lack of homogeneity of cracking or of great lack of uniformity of cracking, or both.

Since the determination of sulfonation residue and free carbon may vary somewhat with the method of analysis employed, detailed procedures of determinations for these respective factors are given, it being understood that values for sulfonation residue and for free carbon employed in the relationships thereof expressed in the claims are to be determined by these detailed procedures or their equivalents for definitive purposes, and that other yardsticks might be devised for the same purpose without departing from the invention.

An overall sample of the tar (wet) resulting from the pyrolysis of a known quantity of oil and obtained by condensation from the resulting gas by bringing the gas down to a temperature of approximately 90° F. is heated in a batch in a stillpot with stirring and with some reflux of the heavier distillate until a dry residual tar having a viscosity of 1000 S. S. U. at 210° F. is obtained. It usually requires several hours to remove the water from the tar.

After separation of the water layer, sulfonation residue is determined upon the hydrocarbon distillate obtained, and is expressed as per cent of the original oil by volume.

Free carbon is determined upon the dry residual tar and is expressed in percent of the original oil by weight.

Free carbon determination is as follows.

*Determination of free carbon*

Free carbon is determined in the manner described in The Gas Chemists Handbook, 3rd edition, 1929, a publication of the American Gas Association, pages 425 and 426.

Sulfonation residue determination is as follows.

Determination of sulfonation residue 250 ml. sample of the above hydrocarbon distillate is shaken with 5% by volume (12.5 mls.) of 94% $H_2SO_4$ in a 500 ml. separatory funnel.

The acid is gradually and cautiously added and the temperature kept below 25° C. by immersing the funnel in ice water when necessary.

After the reaction is completed the contents of the flask are transferred in approximately equal portions to each of two small separatory funnels (150 ml. Squibb separatory funnels).

The acid-washed oil is then centrifuged in the small funnels for approximately five minutes at 500–600 R. P. M. using a laboratory centrifuge adapted to accommodate these funnels.

The acid sludge is run off slowly from each funnel into 200 mls. of ice water contained in a beaker. The acid sludge will sink to the bottom of the beaker and disperse into the water when stirred. The first drop of oil will spread over the surface of the water showing that the end of sludge separation has been reached.

The contents remaining in the funnels are then washed with two successive portions of about 5% by volume of water, followed by centrifuging for two minutes at 500–600 R. P. M. and the separated wash water run off.

The oil is then washed with two successive portions of 5% by volume of 20% KOH solution followed by centrifuging for two minutes at 500–600 R. P. M. and separation of the alkaline solution.

A final wash of 5% by volume of water is made followed by centrifuging for two minutes at 500–600 R. P. M. and separation of the wash water.

The oil is dried by adding a few granules of 4-mesh anhydrous calcium chloride, and filtering, and the volume of dry oil measured.

100 mls. of the washed and dried oil are distilled in the following manner. The oil is put in a 200 ml. round bottom Pyrex boiling flask. The flask is then connected with a small Hempel distilling tube using a cork stopper. The top of the distilling tube is fitted with a two-hole cork stopper containing a thermometer (−5° C. to +360° C. in 1° C. intervals, 75 mm. immersion) and a drawn-out capillary tube extending to the bottom of the flask. The purpose of the capillary tube is to admit a small stream of air during vacuum distillation for the purpose of preventing bumping.

The outlet of the Hempel distilling tube is connected to a Liebig condenser. The outlet of the condenser is connected to a Bogert distilling receiver. The pressure at which the vacuum distillation is conducted is regulated at the outlet of the Bogert receiver by means of a suitable type needle valve.

Any suitable vacuum pump may be used to reduce the pressure to 30 mm. mercury for the final distillation.

Distillation is made at two pressures—(a) oil boiling up to 160° C. is distilled off at atmospheric pressure, and (b) higher boiling fractions are distilled at 30 mm. mercury pressure and the distillation stopped when the temperature reaches 270° C.

If the material being distilled shows any of the characteristic signs of decomposition before the temperature of 270° C. is reached, the distillation is discontinued. The oil boiling up to 160° C. at atmospheric pressure is removed from the Bogert receiver before starting the vacuum distillation. Low pressure steam should be available for use in melting any naphthalene accumulations which may cause stoppages in the condenser tube.

The two distillates are mixed and the total volume recorded. Sulfonation residue tests are made on 10 ml. portions of the mixture in a Babcock milk testing bottle with 30 mls. of 100% $H_2SO_4$ added, followed by heating and shaking periods (six ten-minute heating periods at 98–100° C., each of which is followed by a two-minute shaking period). Any unsulfonated oil is floated into the neck of the Babcock bottle with 94% $H_2SO_4$ where its volume is measured. This quantity of material expressed as a percentage by volume of the original oil is the per cent sulfonation residue employed herein.

Referring to Figure 2.

In this figure, per cent sulfonation residue as above determined and defined is plotted against per cent free carbon as above determined and defined.

The area to the left and below curve A embraces the relations between sulfonation residue and free carbon defining relatively homogeneous and relatively uniform cracking conditions hereunder.

More preferably cracking conditions are selected to produce relationships between sulfonation residue and free carbon falling within the area to the left and below curve B.

Still more preferably cracking conditions are selected to produce relationships between sulfonation residue and free carbon falling within the area to the left and below curve C.

The area to the right and above curve A embraces relationships between sulfonation residue and free carbon which define relatively non-homogeneous and/or relatively non-uniform cracking conditions hereunder.

The formulae for curves A, B and C are as follows:

Curve A _____ $X^{2.3}(y-0.03) = 0.05$
Curve B _____ $X^{2.3}(y-0.03) = 0.03$
Curve C _____ $X^{2.3}(y-0.03) = 0.01$ In which
$x$ = per cent free carbon as above described and defined
$y$ = per cent sulfonation residue as above described and defined.

Moving to the right from the area to the left and below curve C, to the area between curves C and B and thence to the area between curves B and A, relationships of sulfonation residue and free carbon are encountered which progressively define less homogeneous and/or less uniform cracking conditions. To the right and above curve A, these relationships are such as to no longer define relatively homogeneous and relatively uniform cracking hereunder.

The pyrolysis of the selected oil is carried out in vapor phase and in an atmosphere diluted preferably with a readily condensible gas, such as steam, which is preferably present in sufficient quantity to materially reduce the partial pressures of the oil vapors. Preferably the steam is supplied in ratio of at least two pounds of steam to three pounds of oil by weight.

The use of water gas in large quantities as a diluent is preferably avoided, among other things, because of its relatively high concentration of hydrogen. Thus it is preferred to restrict the presence of any blue water gas to below 30 cu. ft. per gallon of oil pyrolyzed and more preferably to below 20 cu. ft. per gallon of oil pyrolyzed, said cu. ft. being taken as if measured at 760 mm. and at a temperature of 60° F.

Preferably the pyrolysis is conducted with total pressures at atmospheric or near atmospheric pressure.

It is to be understood that if desired other materials may be added to the oil pyrolyzed environment in addition to the selected petroleum oil. For example, other hydrocarbon materials such as benzene, toluene, xylene, and solvent naphtha may be added. Reference is made to U. S. Patent 2,226,531, dated December 31, 1940, to Newcomb K. Chaney.

When making any such aromatic hydrocarbon additions, residual oil gas may be calculated, on the basis of the petroleum oil pyrolyzed, with no allowance being made for any material of less than four carbon atoms which might be derived from the additive.

However, to the top of the range of residual oil gas is added 1 cu. ft of gas for each 3% of additive by volume of petroleum oil pyrolyzed with 75 cu. ft. of residual oil gas per gallon of petroleum oil pyrolyzed as a top limit regardless of the amount of additive employed.

As before stated, it is preferred to employ a cyclic gas-making operation in the pyrolysis of the petroleum oil and preferably storage material having a relatively high degree of heat conductivity such as silicon carbide or Carborundum brick is employed for the refractory lining and checkerbrick of the cracking apparatus as distinguished from refractory brick made of ordinary fire clay, although the latter may be employed if desired. The employment of such refractories as Carborundum is very desirable from the standpoint of uniformity of cracking, since, other conditions being the same, its use results in the reduction of temperature swings during the pyrolysis period of the cycle.

Likewise, from the same standpoint, it is highly desirable to employ a short cycle. With the automatic operation of gas set valves, very short cycles are practicable, such as cycles of three minutes, two minutes, and even one minute or less.

In the operation of the process of said last named copending applications tar emulsions may be produced in which the higher boiling fractions of the volatile portion of the tar component of the emulsion is of a highly aromatic hydrocarbon nature. By higher boiling fractions is meant the volatile portion of the tar component of the emulsion boiling above approximately 210° C., such as between 210° C. and 300° to 310° C., or between 210° C. and 400° C., 425° C. or 450° C. and higher. The content of aromatic hydrocarbons in such high boiling fractions of the tar component of tar emulsions produced by the employment of the process of said last mentioned copending application may be of the order of 95% by weight and higher, such as 97% or 98% and higher.

Furthermore a very high proportion of this high boiling aromatic material is in the form of unsaturated resin-forming material, which is polymerizable to resin with the aid of a resin-producing catalyst such as a mineral acid for example sulfuric acid, or an acid of phosphorus; acid-acting metallic halides, such as boron trifluoride, or aluminum chloride, or organic solvent complexes thereof, such as boron trifluoride-diethyl ether complex; activated clay and others. Of this catalytically polymerizable material, a very large proportion, and particularly in the boiling range above 310° C., is in the form of material which is also polymerizable to resin by the application of heat alone.

In the above described solvent extraction of aqueous tar emulsions of the character described to produce my new pitch resin, the conditions of extraction such as the proportion of solvent employed and the temperature, are preferably so chosen that upon distillation of the undissolved tar components (residual tar) to dryness with respect to water, under a total pressure of one atmosphere and to an end temperature of 165° C., no more hydrocarbon oil is taken overhead than a quantity equivalent to 15%, and preferably not more than 10% and still more preferably not more than 6% by weight of the total hydrocarbon material in the original emulsion, while leaving a pitch resin bottoms containing not more than 20% by weight thereof of material soluble in pentane, as determined by the method set forth under "Revised Procedure" in Journal of Research of the National Bureau of Standards, volume 26, Research Paper RP 1387, beginning at page 415. Preferably such pentane-soluble material does not constitute more than 15% and still more preferably not more than 10% by weight of said bottoms.

Preferably prior to the immediately foregoing distillation any free water which has been liberated from the original emulsion in the solvent extraction is separated by decantation from the undissolved material, which is to be distilled. This water separation is, however, not critical.

My new pitch resin may be still further distinguished in the following manner.

A sample of moisture-free pitch resin is mixed with a small quantity of benzene at room temperature. Solution in the benzene, except for the benzene-insoluble material contained in the pitch resin, is effected readily. Ten volumes of acetone is then added to the resulting mixture of solution and any insoluble material present to cause the precipitation of the major part of the acetone-insoluble material contained therein. The mixture is then filtered and the precipitate washed with acetone. The filtrate is evaporated to a non-volatile residue, and this residue redissolved in a small quantity of acetone. Any insoluble material is filtered out and added to the previously separated precipitate. The total material insoluble in acetone, thus obtained, is weighed and considered to be the total acetone-insoluble content of the pitch resin.

The acetone-soluble fraction dissolved, as above described, in a small quantity of acetone is then admixed with ten volumes of petroleum ether containing approximately equal proportions of pentane and hexane, to cause the precipitation of material insoluble in said petroleum ether. The resulting mixture is then filtered and the precipitate washed with petroleum ether of the character described. The volatile solvent is removed from the filtrate by distillation and the oily residue is redissolved in petroleum ether of the character described. Any undissolved material removed by filtration is added to the first mentioned material precipitated by petroleum ether. This total of the material thus precipitated by petroleum ether is weighed and is considered to be the acetone-soluble petroleum ether-insoluble content of the pitch resin.

The total quantity of acetone-insoluble material plus the total quantity of acetone-soluble-petroleum ether-insoluble material is for purposes of definition termed the total quantity of "non-oily material."

My new pitch resins are characterized by having an unusually low ratio of acetone-soluble-petroleum ether-insoluble material to the total such non-oily constituents as compared with other pitches derived from products of pyrolysis of petroleum oil.

In my new pitch resins, the acetone-soluble-petroleum ether-insoluble material expressed in percent by weight of the total non-oily material is lower than 25%, usually lower than 20%, and frequently lower than 15%.

For certain purposes of characterization it may be desirable to modify the immediately foregoing procedure by the removal of and the determination of the benzol insoluble material prior to the initial addition of acetone, the remaining procedure being the same.

In this modified procedure, the sum of the acetone-insoluble material and the acetone-soluble petroleum ether-insoluble material may be considered for purposes of definition as the total "non-oily material other than free carbon."

In my new pitch resins the percentage of acetone-soluble petroleum ether-insoluble material in the total non-oily material other than free carbon is usually lower than 25 and frequently lower than 20.

The pitch resins of the present invention, as distinguished from coal tar pitches, are substantially free from oxygenated material and contain more than 95%, usually more than 97% and preferably at least 98% of carbon and hydrogen.

While liquid phase hydrocarbon material of from 2 to 6 carbon atoms per molecule has been referred to as the solvent employed, paraffinic material preponderantly of from 2 to 6 carbon atoms per molecule, and/or olefine material preponderantly of from 2 to 5 carbon atoms per molecule is more preferred. Still more preferred is paraffinic material preponderantly of from 3 to 5 carbon atoms per molecule and/or olefine material preponderantly of from 3 to 4 carbon atoms per molecule. It will be seen from the above, that it is preferred to employ a solvent comprised of aliphatic hydrocarbon material having no more unsaturation per molecule than one double bond. Liquid phase hydrocarbon material comprised preponderantly of propane, or preponderantly of butane, or preponderantly of pentane, or preponderantly of a mixture of any two or three of these paraffinic hydrocarbons is especially suitable.

While materials and procedures of a particular nature have been described specifically, it is to be understood that these are given by way of illustration. Therefore changes, omissions, additions, substitutions, and/or modifications may be made without departing from the spirit of the invention.

I claim:

1. A pitch resin produced by demulsification and extraction with liquid phase aliphatic hydrocarbon material and by distillation from a pitch-containing tar emulsion obtained in the vapor phase pyrolysis of petroleum oil in the presence of steam, said pitch resin being characterized by a content less than 20% its weight of material soluble in pentane, by a content of material soluble in acetone and insoluble in petroleum ether less than 25% of the total non-oily material (excluding free carbon) insoluble in petroleum ether, and by its content of more than 95% carbon and hydrogen.

2. A pitch resin produced by demulsification and extraction with liquid phase aliphatic hydrocarbon material and by distillation from a pitch-containing tar emulsion obtained in the vapor phase pyrolysis of petroleum oil in the presence of steam, said pitch resin being characterized by a content no more than 10% its weight of material soluble in pentane, by a content of material soluble in acetone and insoluble in petroleum ether less than 25% of the total non-oily material (excluding free carbon) insoluble in petroleum ether, and by its content of more than 95% carbon and hydrogen.

3. A pitch resin produced by demulsification and extraction with liquid phase aliphatic hydrocarbon material and by distillation from a pitch-containing tar emulsion obtained in the vapor phase pyrolysis of petroleum oil in the presence of steam, said pitch resin being characterized by a content less than 20% its weight of material soluble in pentane and by its content of more than 95% carbon and hydrogen.

4. A pitch resin produced by demulsification and extraction with liquid phase aliphatic hydrocarbon material and by distillation from a pitch-containing tar emulsion obtained in the vapor phase pyrolysis of petroleum oil in the presence of steam, said pitch resin being characterized by a content no more than 10% its weight of material soluble in pentane and by its content of more than 95% carbon and hydrogen.

5. A pitch resin produced by demulsification and extraction with liquid phase aliphatic hydrocarbon material and by distillation from a pitch-containing tar emulsion obtained in the vapor phase pyrolysis of petroleum oil in the presence of steam, said pitch resin being characterized by its content of more than 95% carbon and hydrogen and by a content of material soluble in acetone and insoluble in petroleum ether less than 25% of the total "non-oily" material (excluding free carbon) insoluble in petroleum ether.

6. A pitch resin produced by demulsification and extraction with liquid phase aliphatic material and by distillation from a pitch-containing tar emulsion obtained in the vapor phase pyrolysis of petroleum oil in the presence of steam, said pitch resin being characterized by its content of more than 95% carbon and hydrogen and by a content of material soluble in acetone and insoluble in petroleum ether less than 15% of the total "non-oily" material (excluding free carbon) insoluble in petroleum ether.

HOWARD R. BATCHELDER.

REFERENCES CITED

The following references are of record in the file of this patent:

UNITED STATES PATENTS

| Number | Name | Date |
| --- | --- | --- |
| 2,383,362 | Batchelder | Aug. 21, 1945 |
| 2,383,363 | Batchelder | Aug. 21, 1945 |
| 2,409,437 | La Crosse | Oct. 15, 1946 |